(12) United States Patent
Ochiishi

(10) Patent No.: US 10,040,203 B2
(45) Date of Patent: Aug. 7, 2018

(54) ROBOT HAND

(71) Applicant: FANUC CORPORATION, Yamanashi (JP)

(72) Inventor: Yoshinori Ochiishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/807,296

(22) Filed: Nov. 8, 2017

(65) Prior Publication Data
US 2018/0178396 A1 Jun. 28, 2018

(30) Foreign Application Priority Data
Dec. 26, 2016 (JP) .................................. 2016-250920

(51) Int. Cl.
| | |
|---|---|
| B25J 15/00 | (2006.01) |
| B25J 15/04 | (2006.01) |
| B25J 9/12 | (2006.01) |
| B25J 15/02 | (2006.01) |

(52) U.S. Cl.
CPC ........... B25J 15/0095 (2013.01); B25J 9/123 (2013.01); B25J 15/0061 (2013.01); B25J 15/0253 (2013.01); B25J 15/0433 (2013.01)

(58) Field of Classification Search
CPC ............... B25J 15/0004; B25J 15/0095; B25J 15/0052; B25J 15/0061; B25J 15/0253; B25J 15/028; B25J 15/0293; B25J 15/0433; B25J 9/123; B65G 47/901; B65G 47/907

USPC .............................................. 294/119.1, 86.4
See application file for complete search history.

(56) References Cited

U.S. PATENT DOCUMENTS

| | | | | |
|---|---|---|---|---|
| 3,001,812 A | * | 9/1961 | Anderson | B66C 1/30 294/106 |
| 4,621,852 A | * | 11/1986 | Maki | B25J 15/10 294/67.22 |
| 4,968,082 A | * | 11/1990 | Thinlot | B25J 15/00 294/119.1 |
| 6,082,797 A | * | 7/2000 | Antonette | B25J 9/104 294/103.1 |

(Continued)

FOREIGN PATENT DOCUMENTS

| | | |
|---|---|---|
| JP | 2015-000471 A | 1/2015 |
| JP | 2015-166126 A | 9/2015 |

*Primary Examiner* — Dean J Kramer
(74) *Attorney, Agent, or Firm* — Maier & Maier, PLLC

(57) ABSTRACT

A robot hand includes: a first movable member including a first pushing surface pushed against a first surface of a workpiece and a second pushing surface pushed against a second surface of the workpiece, intersecting the first surface, supported in a manner capable of moving in a first direction perpendicular to the first pushing surface, a second movable member supported by the first movable member in a manner capable of relatively moving in a second direction intersecting a movement direction of the first movable member, a third pushing surface pushed against a third surface facing the second surface, an actuator for pressing the first and the second movable members in the first direction, and a pressing force conversion mechanism converting a part of the pressing force generated by the actuator into a pressing force in a direction of moving the second movable member relative to the first movable member.

5 Claims, 11 Drawing Sheets

(56) References Cited

U.S. PATENT DOCUMENTS

| | | | | |
|---|---|---|---|---|
| 6,508,497 | B1* | 1/2003 | Nerger | B23Q 7/04 |
| | | | | 294/102.1 |
| 7,887,108 | B1* | 2/2011 | Cawley | B25J 15/022 |
| | | | | 294/106 |
| 8,317,241 | B2* | 11/2012 | Ehnes | B25J 9/142 |
| | | | | 294/192 |
| 8,602,470 | B2* | 12/2013 | Bieler | B25J 15/026 |
| | | | | 294/119.1 |
| 2009/0279999 | A1* | 11/2009 | Faulkner | B25J 9/0093 |
| | | | | 414/800 |
| 2015/0251319 | A1 | 9/2015 | Ishikawa et al. | |
| 2016/0252826 | A1* | 9/2016 | Volkov | G03F 7/70741 |
| | | | | 294/119.1 |

* cited by examiner

ROBOT HAND

CROSS-REFERENCE TO RELATED APPLICATIONS

This application is based on and claims priority to Japanese Patent Application No. 2016-250920 filed on Dec. 26, 2016, the entire content of which is incorporated herein by reference.

TECHNICAL FIELD

The present invention relates to a robot hand.

BACKGROUND ART

Conventionally, there is known a robot hand that is attached to a tip of a wrist of a robot, and that grips a workpiece by holding a vertical surface and a horizontal bottom surface of the workpiece (for example, see PTL 1).

The robot hand disclosed in PTL 1 includes claws that respectively contact the vertical surface and the horizontal bottom surface of a workpiece, and grips the workpiece by separately and linearly moving the claws by different actuators.

CITATION LIST

Patent Literature

{PTL 1} Japanese Unexamined Patent Application, Publication No. 2015-166126

SUMMARY OF INVENTION

One aspect of the present invention provides a robot hand including: a first movable member that includes a first pushing surface to be pushed against a first surface of a workpiece and a second pushing surface to be pushed against a second surface, of the workpiece, intersecting the first surface, and that is supported in a manner capable of moving in a first direction perpendicular to the first pushing surface, a second movable member that is supported by the first movable member in a manner capable of relatively moving in a second direction intersecting a movement direction of the first movable member, and that includes a third pushing surface to be pushed against a third surface facing the second surface, an actuator that generates a pressing force for pressing the first movable member and the second movable member in the first direction, and a pressing force conversion mechanism that converts a part of the pressing force generated by the actuator into a pressing force in a direction of moving the second movable member relative to the first movable member.

DESCRIPTION OF EMBODIMENTS

A robot hand 1 according to an embodiment of the present invention will be described below with reference to the drawings.

Figure 1:
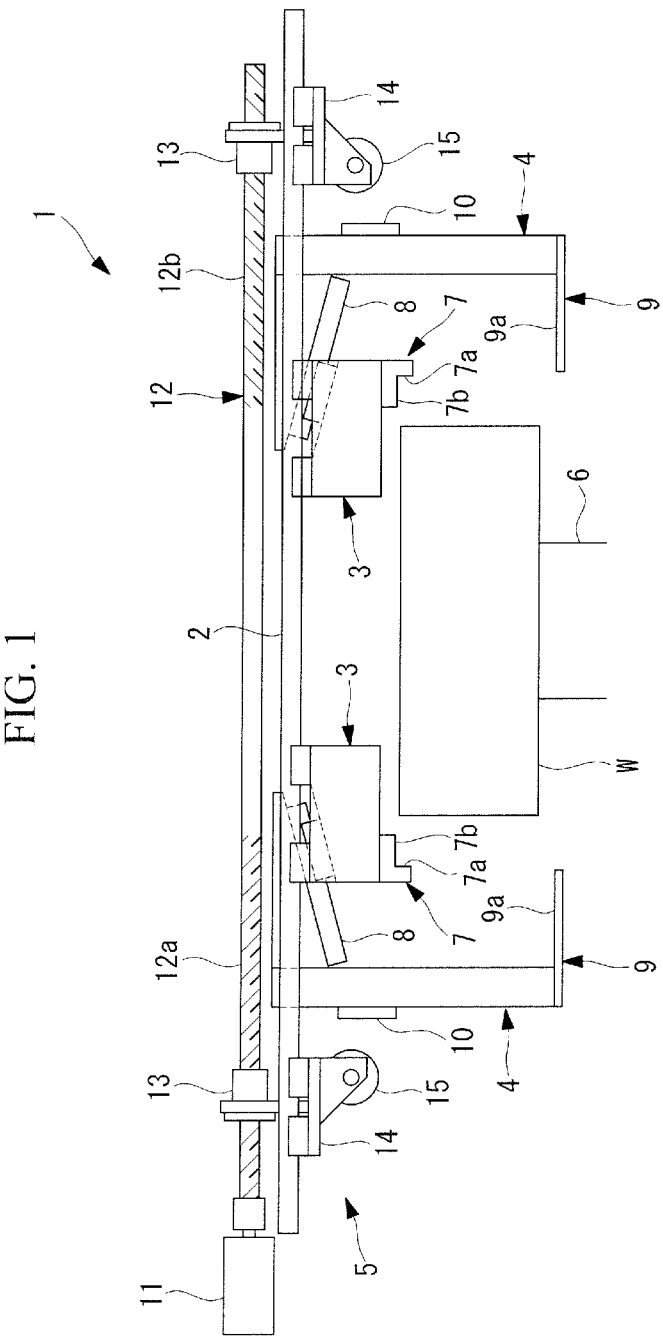
FIG. 1 is a front view showing a robot hand according to an embodiment of the present invention.

The robot hand 1 according to the present embodiment is a hand that is attached to a tip of a wrist of a robot so as to grip a workpiece W, and as shown in FIG. 1, the robot hand 1 includes a pair of first movable members 3, which are supported in a manner capable of linearly moving in a direction of coming close to or separating from each other along a guide rail 2, second movable members 4, which are movably attached to respective first movable members 3, and an actuator 5, which drives the first movable members 3 and the second movable members 4. FIG. 1 does not show a base member for attaching the robot hand 1 to the robot, for the sake of simplicity.

As shown in FIG. 1, each first movable member 3 is suspended from the guide rail 2 in a state where the guide rail 2 is substantially horizontally arranged, and is supported in a manner capable of moving in a horizontal first direction along the guide rail 2. Each first movable member 3 is arranged close to and above a cuboid workpiece W placed on a support base 6, and a pushing member 7 is provided at a lower portion of the first movable member 3, the pushing member 7 including a first pushing surface 7a to be pushed against a substantially vertical side surface (first surface) of the workpiece W, and a second pushing surface 7b to be pushed against a substantially horizontal upper surface (second surface) of the workpiece W.

Figure 2:
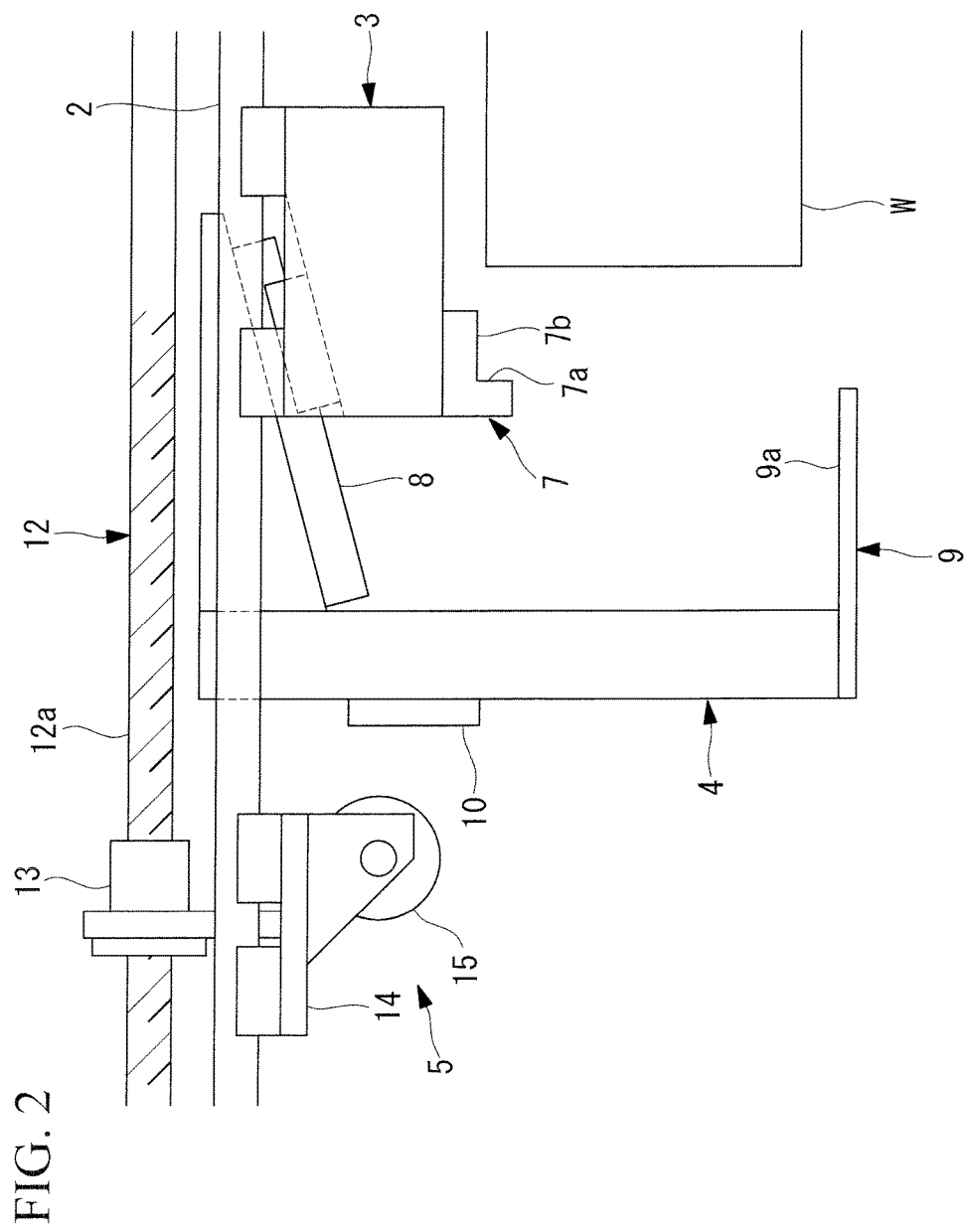
FIG. 2 is an enlarged view showing one side portion of the robot hand in FIG. 1.

As shown in FIG. 2, each second movable member 4 includes a linear guide (guide mechanism, pressing force conversion mechanism) 8 between the second movable member 4 and the first movable member 3, and is supported in a manner capable of moving relative to the first movable member 3 in a second direction inclined relative to the horizontal direction at an angle smaller than 90 degrees, such as 15 degrees. In the state in FIG. 1, each second movable member 4 is supported by the linear guide 8 to move in an upward direction relative to the first movable member 3 when the second movable member 4 is relatively moved in a direction of coming close to the first movable member 3 supporting the second movable member 4.

Each second movable member 4 is provided with a pushing member 9 including a third pushing surface 9a, which is arranged facing the second pushing surface 7b of the first movable member 3 while being substantially parallel with and spaced from the second pushing surface 7b. The pushing member 9 of the second movable member 4 is pushed against a lower surface (third surface) of the workpiece W in a manner holding the workpiece W, when the second movable member 4 is moved in the upward direction relative to the first movable member 3 in a state where the pushing member 9 is arranged below the workpiece W.

The pushing member 7 of the first movable member 3 and the pushing member 9 of the second movable member 4 have predetermined width dimensions in a direction perpendicular to the plane of FIG. 1, and are to come into surface contact with the workpiece W over predetermined ranges.

Each second movable member 4 is provided with a pressing surface 10, which is to be pressed by the actuator 5 described below. The pressing surface 10 extends in a direction perpendicular to the guide rail 2.

The actuator 5 includes a motor 11, a ball screw 12, which is rotated around a longitudinal axis by the motor 11, a pair of sliders 14 to which nuts 13 to be meshed with the ball screw 12 are fixed and which are to move along the guide rail 2, and a roller 15 provided to each slider 14.

The ball screw 12 includes a right screw 12a on one side in the longitudinal direction, and a left screw 12b on the other side.

The nuts 13 are arranged at positions where the nuts 13 are meshed with the right screw 12a and the left screw 12b of the ball screw 12, respectively. Accordingly, when the ball screw 12 is rotated in one direction by driving of the motor 11, the two nuts 13 are moved in a direction of coming close to or separating from each other in the longitudinal direction of the ball screw 12.

The roller 15 is supported by the slider 14 in a manner capable of rotating around an axial line perpendicular to a plane including a longitudinal axis of the guide rail 2. When the slider 14 is moved along the guide rail 2 in a direction of coming close to the second movable member 4, an outer circumferential surface of the roller 15 comes into contact with the pressing surface 10 of the second movable member 4, and a pressing force in the direction along the guide rail 2 is applied to the second movable member 4. Also, at the time of moving the second movable member 4 relative to the first movable member 3, the outer circumferential surface of the roller 15 is caused to roll on the pressing surface 10 such that a pressing force may be applied while allowing movement of the second movable member 4 relative to the first movable member 3.

Furthermore, in the present embodiment, the sliding resistance of the first movable member 3 with respect to the guide rail 2 is set sufficiently smaller than the sliding resistance of the linear guide 8 of the second movable member 4 with respect to the first movable member 3. A retaining mechanism is thus configured, which is for retaining the second movable member 4 such that the second movable member 4 does not move relative to the first movable member 3 until a pressing force that is transmitted from the second movable member 4 to the first movable member 3 due to the second movable member 4 being pressed exceeds a predetermined threshold.

An effect of the robot hand 1 according to the present embodiment having the configuration described above will be described below.

As shown in FIG. 1, to grip a workpiece W by using the robot hand 1 according to the present embodiment, the robot hand 1 is moved such that the guide rail 2 is arranged substantially in parallel above the workpiece W that is supported by the support base 6, and the robot hand 1 is arranged such that the workpiece W is arranged between the pair of first movable members 3 and between the second movable members 4.

Figure 3:
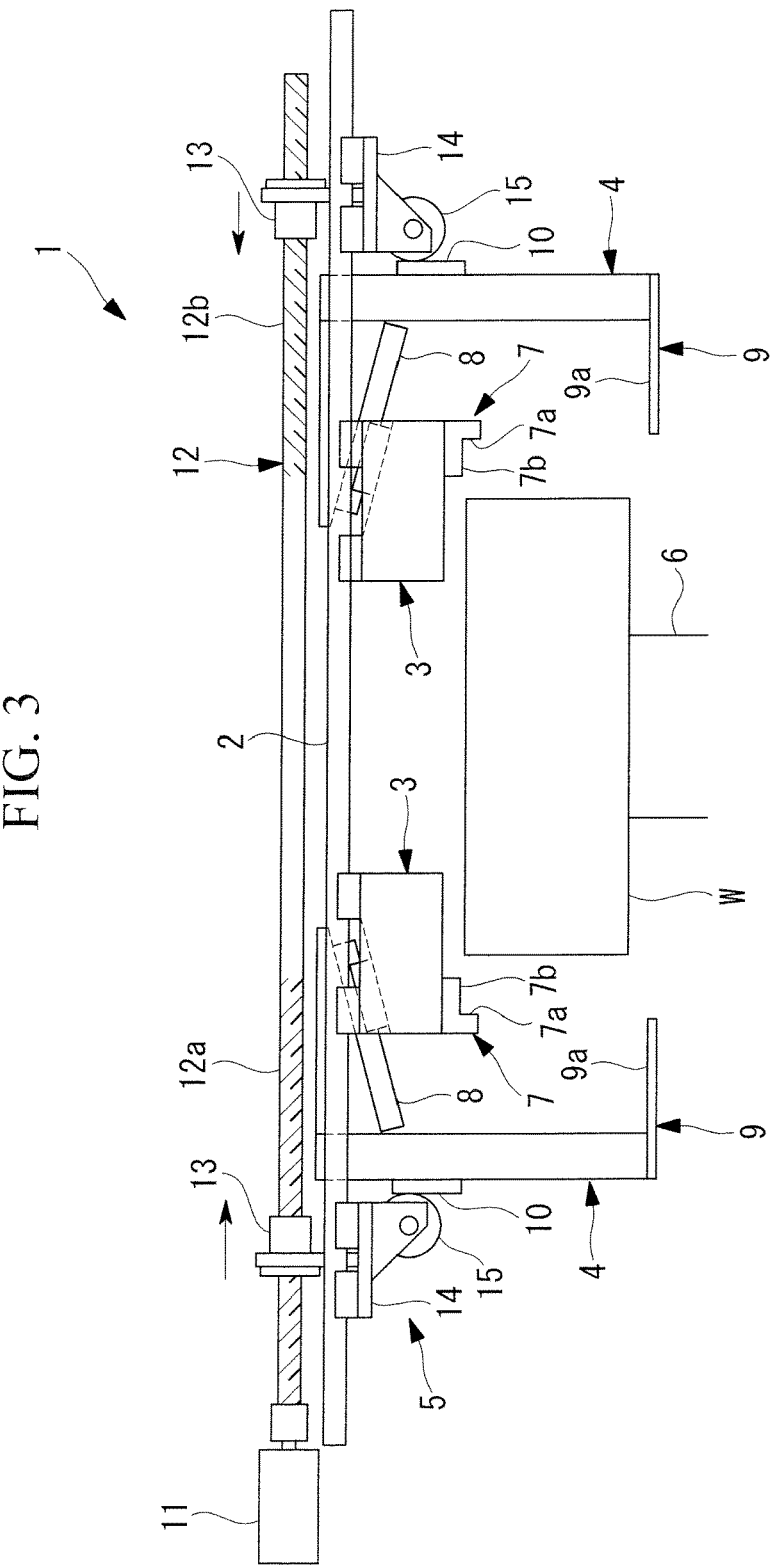
FIG. 3 is a front view showing a state where an actuator of the robot hand in FIG. 1 is driven, and rollers of sliders are pushed against pressing surfaces of second movable members.

The motor 11 is operated in this state, and the pair of sliders 14 are moved along the guide rail 2 in a direction of coming close to each other, as shown in FIG. 3. The rollers 15 provided to the sliders 14 thereby come into contact with the pressing surfaces 10 of the second movable members 4, and apply a pressing force to the second movable members 4.

Figure 4:
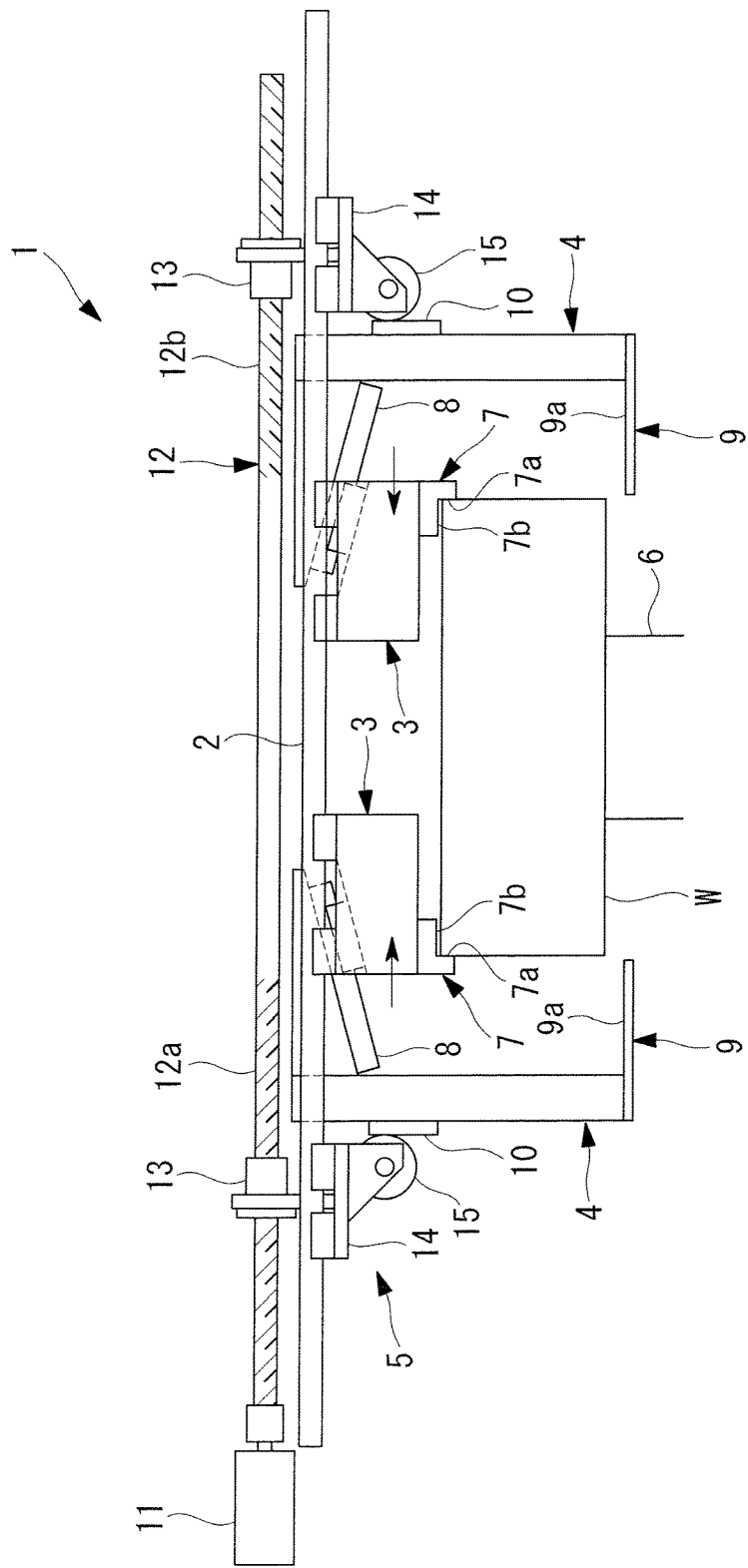
FIG. 4 is a front view showing a state where the actuator is further driven from the state in FIG. 3, and first pushing surfaces of first movable members are abutted against side surfaces of a workpiece.

The pressing force applied to the second movable members 4 is transmitted to the first movable members 3, and the first movable members 3 are moved along the guide rail 2. Accordingly, as shown in FIG. 4, the first pushing surfaces 7a of the pushing members 7 provided to the first movable members 3 are pushed against both side surfaces of the workpiece W.

At this time, because the sliding resistance of the first movable members 3 with respect to the guide rail 2 is set sufficiently smaller than the sliding resistance of the second movable members 4 with respect to the first movable members 3, the second movable members 4 and the first movable members 3 are moved along the guide rail 2 in an integrated manner without moving relative to each other.

With the pair of first pushing surfaces 7a pushed against both side surfaces of the workpiece W, the workpiece W is gripped in the horizontal direction in a state where the robot hand 1 is positioned in the horizontal direction of the workpiece W. Moreover, in the state where the first pushing surfaces 7a are pushed against the side surfaces of the workpiece W, the pressing force that is transmitted from the second movable members 4 to the first movable members 3 is increased than the predetermined threshold, and thus, the second movable members 4 are moved relative to the first movable members 3 while being guided by the linear guides 8. That is, the second movable members 4 are moved obliquely upward with respect to the first movable members 3 that are stopped by being abutted against the side surfaces of the workpiece W.

Figure 5:
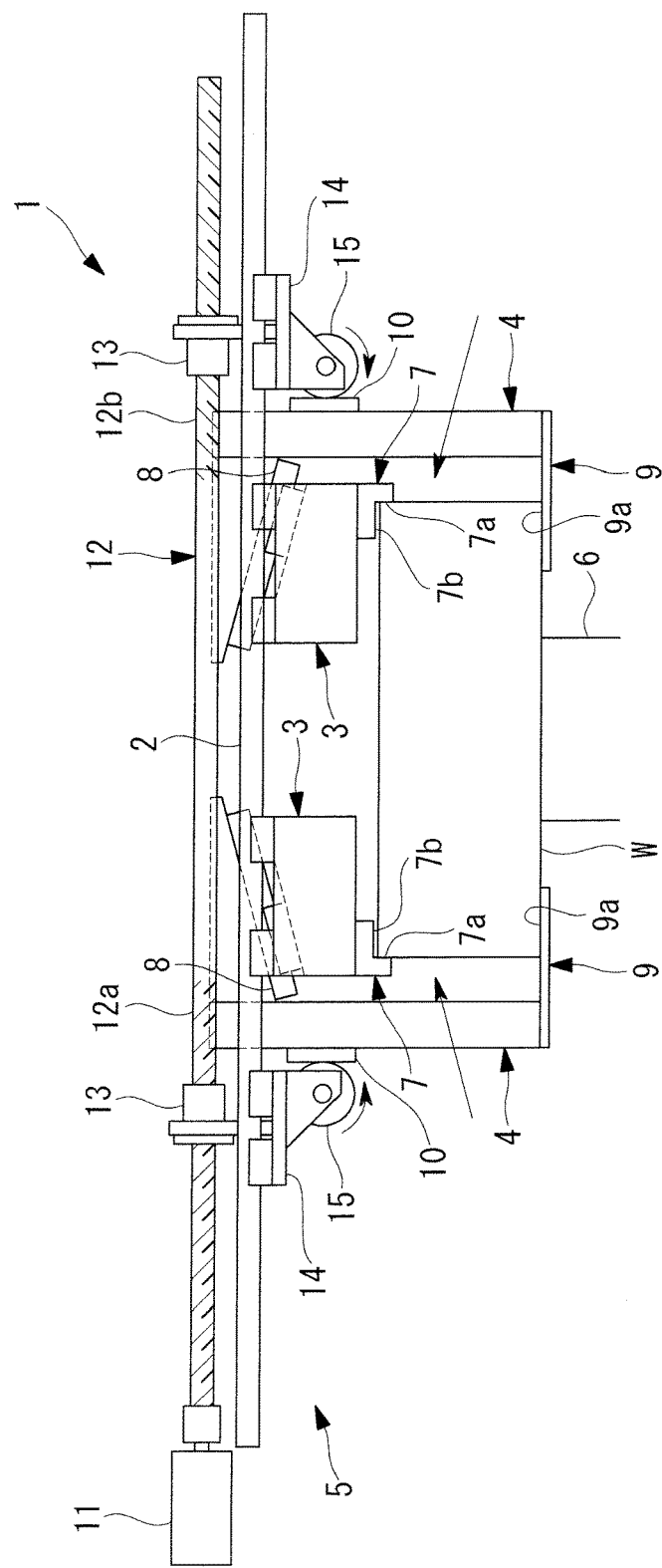
FIG. 5 is a front view showing a state where the actuator is further driven from the state in FIG. 4, and third pushing surfaces of the second movable members are pushed against a bottom surface of the workpiece.
Figure 6:
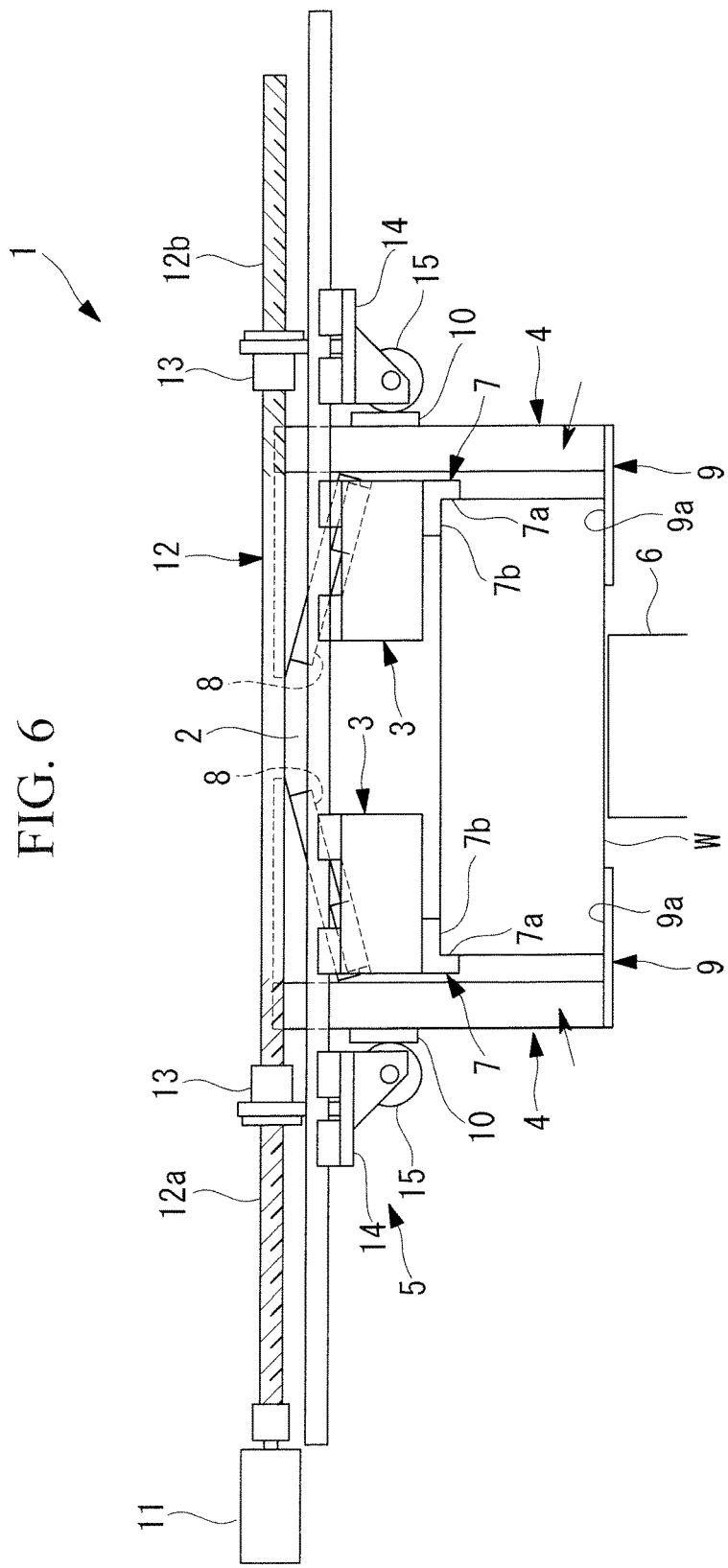
FIG. 6 is a front view showing a gripping state where the actuator is further driven from the state in FIG. 5, and the workpiece is sandwiched in a vertical direction between second pushing surfaces of the first movable members and the third pushing surfaces of the second movable members.

Accordingly, as shown in FIG. 5, the third pushing surfaces 9a of the pushing members 9 provided to the second movable members 4 are raised, and are brought into contact with the bottom surface of the workpiece W, near the side surfaces. Then, the sliders 14 are moved in the direction of coming close to each other, and the second movable members 4 are further raised, and thus, as shown in FIG. 6, the workpiece W is gripped by being held by the pair of second movable members 4 and sandwiched in the vertical direction between the second pushing surfaces 7b of the first movable members 3 and the third pushing surfaces 9a of the second movable members 4.

As described above, the robot hand 1 of the present embodiment has an advantage that a workpiece W may be horizontally and vertically gripped by one actuator 5, without using two or more actuators. Advantages that the cost can be reduced by reducing the number of actuators, and that control can be simplified may thereby be achieved.

Additionally, in the present embodiment, the retaining mechanism is configured by making the sliding resistance of the first movable members 3 with respect to the guide rail 2 sufficiently smaller than the sliding resistance of the linear guides 8 of the second movable members 4 with respect to the first movable members 3. Alternatively, a retaining mechanism, such as a spring, that starts to be displaced by a pressing force of a predetermined threshold or more may be arranged between the second movable member 4 and the first movable member 3.

Figure 7:
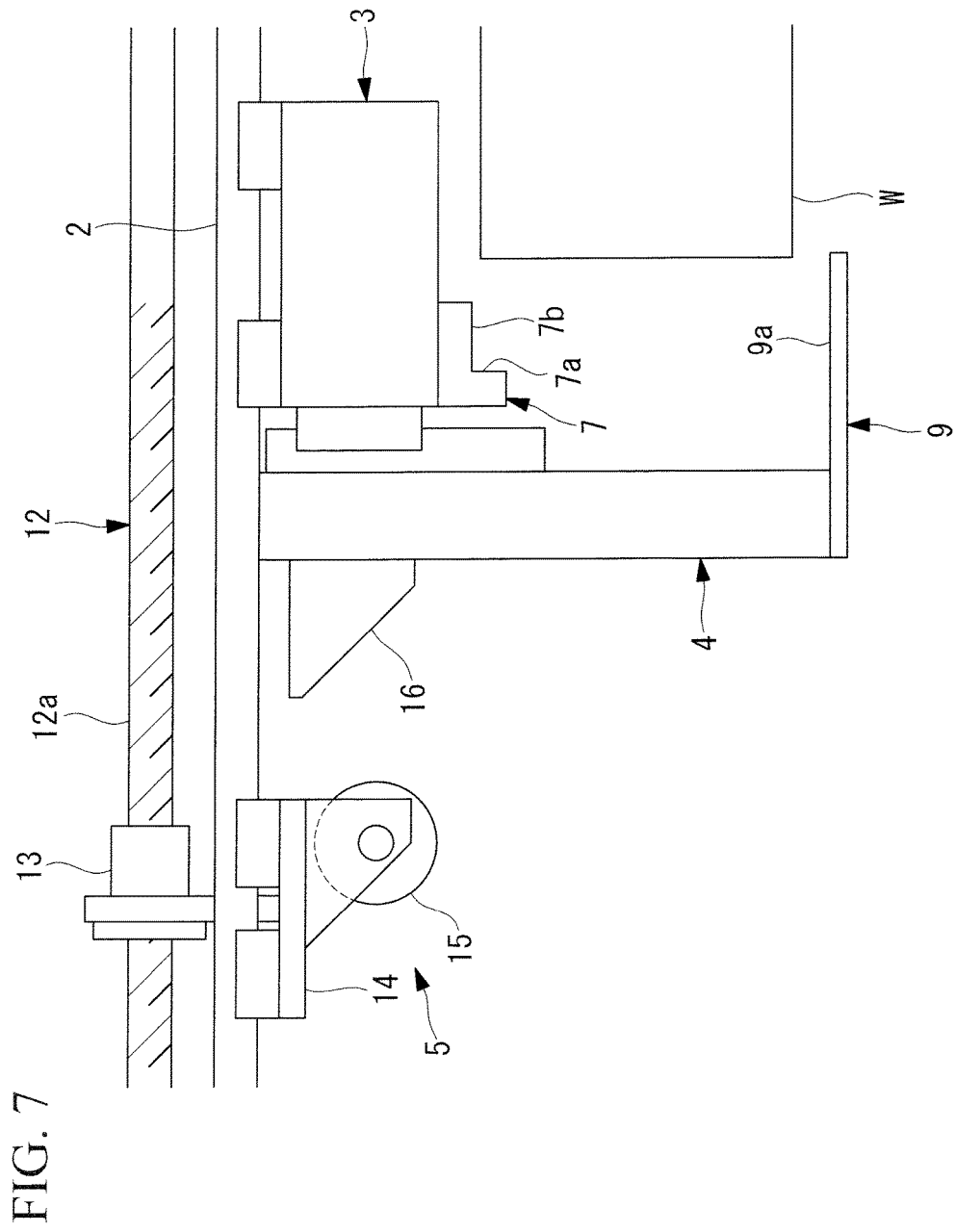
FIG. 7 is an enlarged view showing a modification of the robot hand in FIG. 1.

Also, in the embodiment described above, the pressing force conversion mechanism is configured by attaching the second movable member 4 to the first movable member 3 in such a way that the second movable member 4 is guided obliquely by the linear guide 8. Alternatively, as shown in FIG. 7, the second movable member 4 may be attached to the first movable member 3 by the linear guide 8 in a manner capable of moving in the vertical direction, and a tilted surface (pressing force conversion mechanism) 16 for causing the roller 15 to roll may be provided to the second movable member 4.

Figure 8:
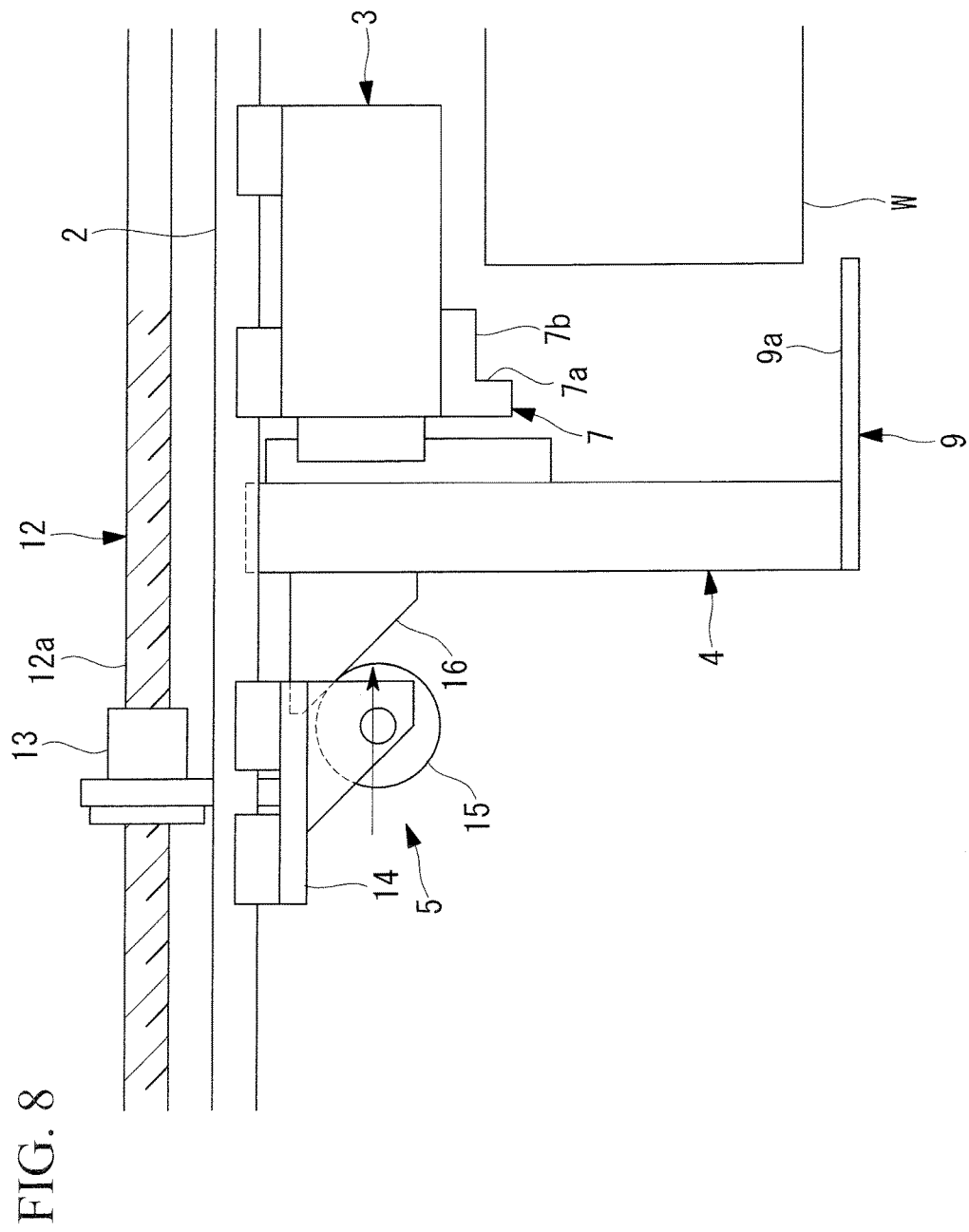
FIG. 8 is a front view showing a state where the actuator in FIG. 7 is driven, and the rollers of the sliders are pushed against tilted surfaces of the second movable members.
Figure 9:
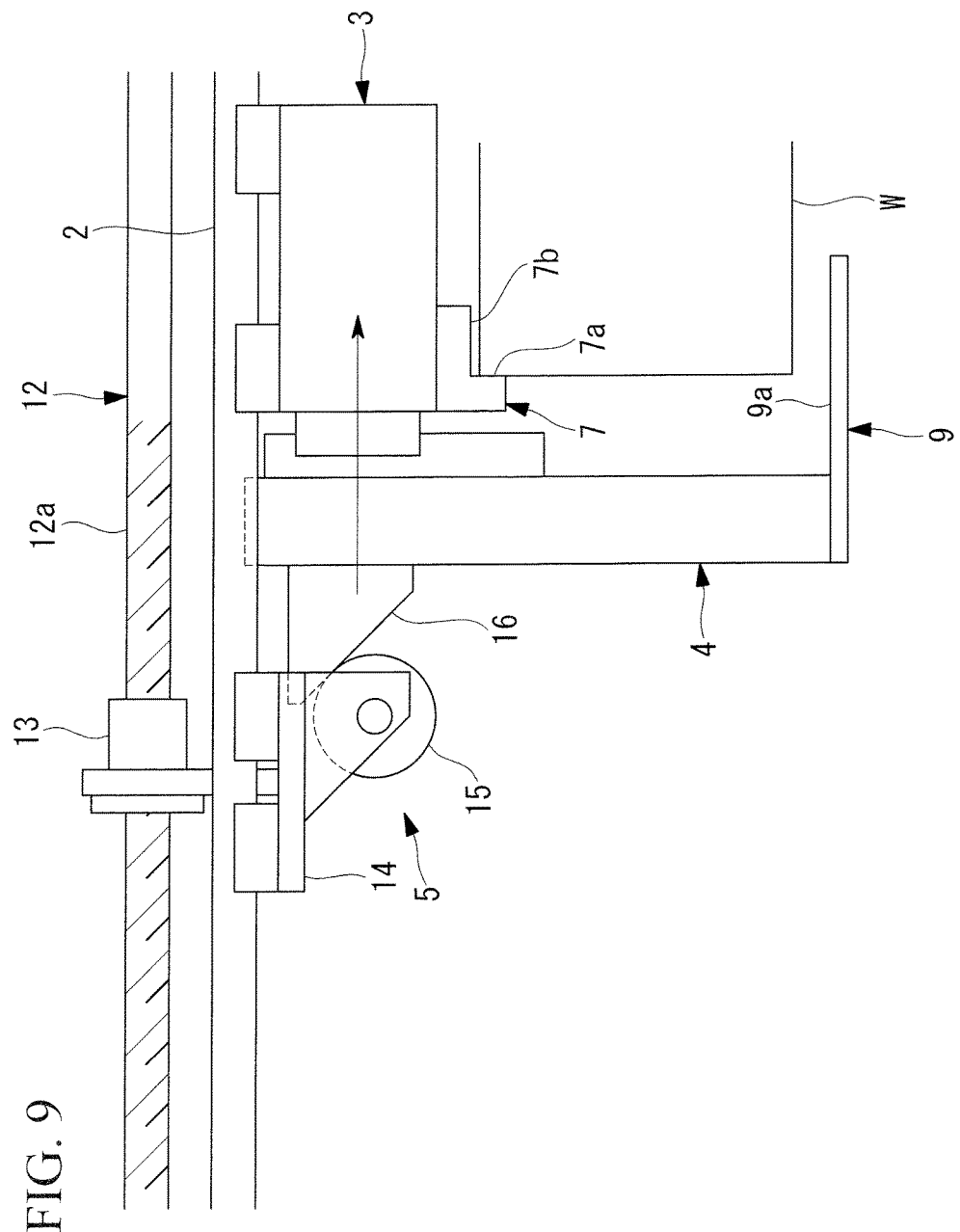
FIG. 9 is a front view showing a state where the actuator is further driven from the state in FIG. 8, and the first pushing surfaces of the first movable members are abutted against the side surfaces of the workpiece.
Figure 10:
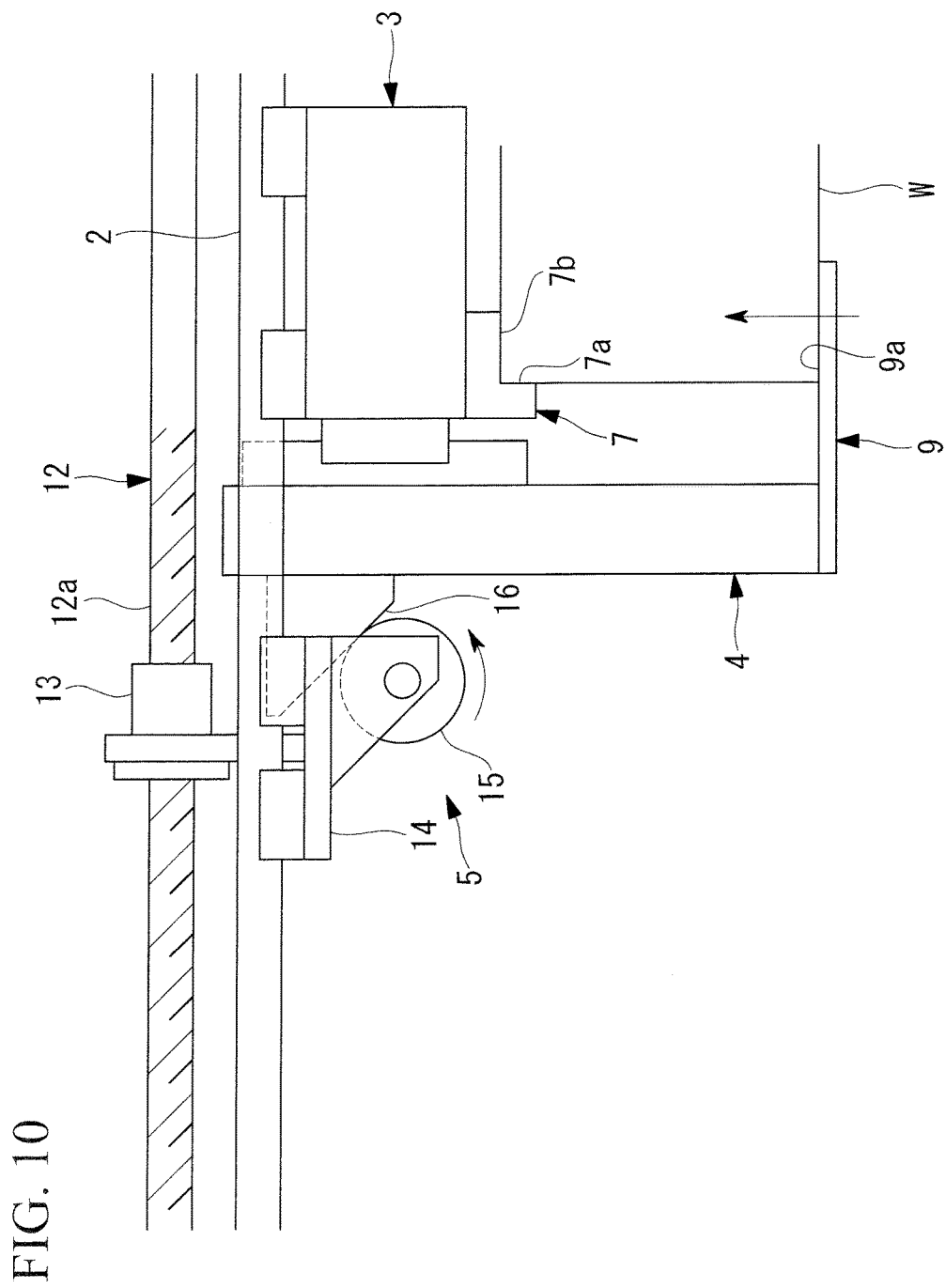
FIG. 10 is a front view showing a gripping state where the actuator is further driven from the state in FIG. 9, and the workpiece is sandwiched in the vertical direction between the second pushing surfaces of the first movable members and the third pushing surfaces of the second movable members.

That is, as shown in FIG. 8, when a pressing force is applied to the second movable member 4 by the roller 15, which is attached to the slider 14, being abutted against the tilted surface 16, the pressing force is transmitted from the second movable member 4 to the first movable member 3, and the two members are horizontally moved along the guide rail 2 in an integrated manner. Then, as shown in FIG. 9, when the first pushing surface 7a of the first movable member 3 is pushed against the side surface of the workpiece W, further movement of the first movable member 3 is stopped, and as shown in FIG. 10, the roller 15 rolls on the tilted surface 16 and a part of the pressing force is converted into a force of pushing the second movable member 4 upward, and the second movable member 4 is raised with respect to the first movable member 3. Accordingly, the workpiece W may be gripped by the third pushing surfaces 9a of the second movable members 4 holding the lower surface of the workpiece W.

Additionally, in the present embodiment, the roller 15 is provided to the slider 14, and the pressing surface 10 or the tilted surface 16 is provided to the second movable member 4, but the reverse is also possible.

Figure 11:
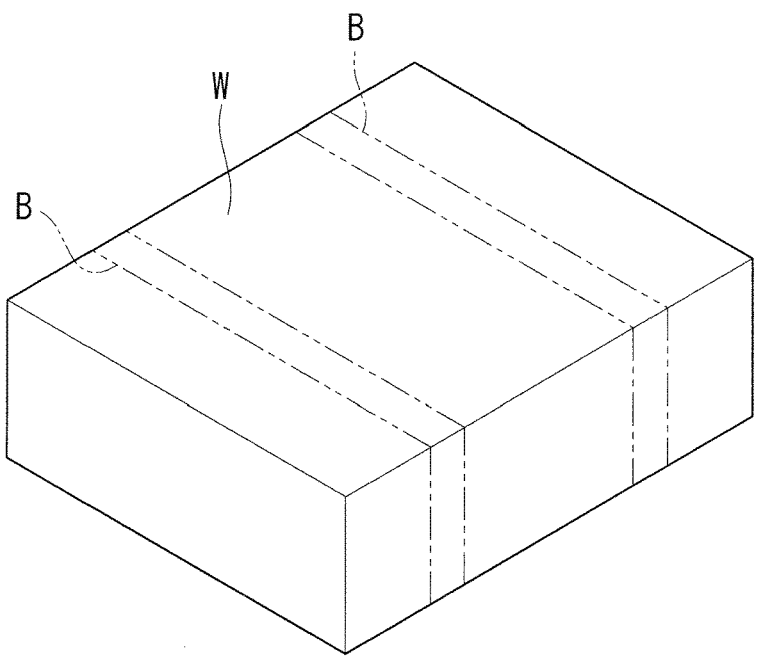
FIG. 11 is a perspective view of a workpiece describing an example of a grip position of the robot hand.
Figure 12:
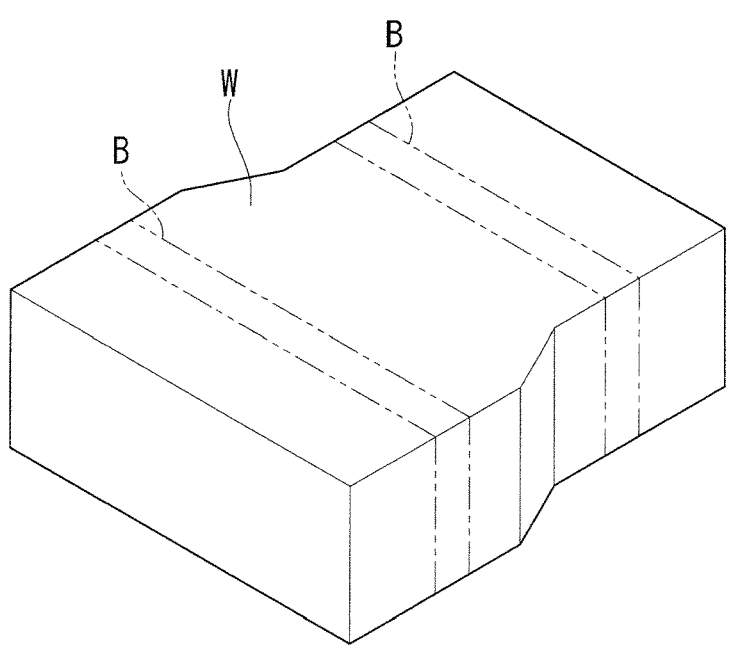
FIG. 12 is a perspective view showing another example of the workpiece.

Moreover, in the embodiment described above, the second movable members 4 are arranged one each on the left and right of the workpiece W, but if, as shown in FIG. 11, the width dimension is constant across the entire length of the workpiece W, a plurality of pairs of second movable members 4 may be provided at intervals in a length direction of the workpiece W, and the workpiece W may be gripped at a plurality of grip positions B by one actuator 5. Also, as shown in FIG. 12, in the case where the width dimension of the workpiece W in the length direction is varied, the robot hand 1 provided with the actuator 5 may be used at each grip position B.

From the above-described embodiment, the following aspects of the present invention are derived.

An aspect of the present invention provides a robot hand including: a first movable member that includes a first pushing surface to be pushed against a first surface of a workpiece and a second pushing surface to be pushed against a second surface, of the workpiece, intersecting the first surface, and that is supported in a manner capable of moving in a first direction perpendicular to the first pushing surface, a second movable member that is supported by the first movable member in a manner capable of relatively moving in a second direction intersecting a movement direction of the first movable member, and that includes a third pushing surface to be pushed against a third surface facing the second surface, an actuator that generates a pressing force for pressing the first movable member and the second movable member in the first direction, and a pressing force conversion mechanism that converts a part of the pressing force generated by the actuator into a pressing force in a direction of moving the second movable member relative to the first movable member.

According to the present aspect, when a pressing force is generated by the actuator, the first movable member and the second movable member are moved in the first direction, and the first pushing surface of the first movable member is pushed against the first surface, of the workpiece, arranged perpendicularly to the first direction. Moreover, a part of the pressing force of the actuator is converted, by the pressing force conversion mechanism, into a pressing force in a direction of moving the second movable member relative to the first movable member, and the second movable member is moved in the second direction relative to the first movable member.

The third pushing surface provided to the second movable member is pushed against the third surface that faces the second surface intersecting the first surface, and the workpiece may be sandwiched between the third pushing surface and the second pushing surface. That is, by pushing the first pushing surface against the workpiece, the workpiece may be sandwiched between the second pushing surface and the third pushing surface in a state where the robot hand is positioned with respect to the workpiece. An inexpensive robot hand that pushes the pushing surfaces against two intersecting surfaces by one actuator may thus be provided.

According to the aspect described above, the first movable member, the second movable member, and the pressing force conversion mechanism may each be provided in pair, the pair of first movable members may be arranged with the first pushing surfaces facing each other so that the first pushing surfaces are pushed against the first surfaces of the workpiece that face each other, and the actuator may generate the pressing force in such a way that one of the first movable members and one of the second movable members come close to the other of the first movable members and the other of the second movable members.

This allows the pair of first movable members to be moved in a direction of coming close to each other by the actuator, and the workpiece may be sandwiched between the first pushing surfaces. That is, by sandwiching the workpiece between the second pushing surfaces and the third pushing surfaces in a state where the workpiece is sandwiched between the first pushing surfaces and where the robot hand is positioned with respect to the workpiece, the workpiece may be reliably gripped by sandwiching intersecting surfaces of the workpiece by one actuator.

Also, according to the aspect described above, the pressing force conversion mechanism may be a guide mechanism that guides the second movable member in the second direction that is inclined relative to the first direction at an angle smaller than 90 degrees.

This allows the first movable member to be moved in the first direction and the second movable member to be guided by the guide mechanism and be moved in the second direction that is inclined with respect to the first direction, when the first movable member and the second movable member are pressed by the actuator in the first direction. Accordingly, the workpiece may be reliably gripped by moving, by one actuator, the first movable member in the first direction and the second movable member in the second direction intersecting the first direction, and pushing the first pushing surface and then the third pushing surface against two intersecting surfaces of the workpiece.

Also, according to the aspect described above, the second movable member may be supported in a manner capable of moving in the second direction that is perpendicular to the movement direction of the first movable member, and the pressing force conversion mechanism may include a tilted surface that is fixed to one of the actuator and the second movable member and that is inclined at angles smaller than 90 degrees with respect to the first direction and the second direction, and a roller that is attached to the other of the actuator and the second movable member and that is caused to roll on the tilted surface.

This allows the first movable member to be moved in the first direction when the first movable member and the second movable member are pressed in the first direction by the actuator. Meanwhile, the second movable member is moved in a second direction that is perpendicular to the first movable member due to the roller or the tilted surface provided to the actuator being moved in the first direction, thereby causing the roller to roll on the tilted surface. Accordingly, the workpiece may be reliably gripped by moving, by one actuator, the first movable member in the first direction and the second movable member in the second direction intersecting the first direction, and pushing the first pushing surface and then the third pushing surface against two intersecting surfaces of the workpiece.

Moreover, according to the aspect described above, the actuator may be configured to press the second movable member in the first direction, and the robot hand may further include a retaining mechanism, the retaining mechanism retains the second movable member such that the second movable member does not move relative to the first movable member until a pressing force that is transmitted from the second movable member to the first movable member exceeds a predetermined threshold.

This allows a pressing force to be transmitted to the first movable member via the second movable member, when the second movable member is pressed in the first direction by the actuator. In a state where the first movable member is not restrained, the first movable member is moved by a small pressing force, and the first movable member and the second movable member are moved in the first direction by the retaining mechanism in an integrated manner. When the first pushing surface of the first movable member is abutted against and stopped by the first surface of the workpiece, the pressing force transmitted from the second movable member to the first movable member is increased, and when the pressing force exceeds a predetermined threshold, the second movable member is moved relative to the first movable member, and the second pushing surface and the third pushing surface are pushed against the second surface intersecting the first surface of the workpiece and the third surface, and the workpiece may be reliably gripped.

That is, according to the present aspect, the first pushing surface may be pushed against the workpiece by the first movable member, and then, the second pushing surface and the third pushing surface may be pushed against the workpiece by the second movable member, without providing a plurality of actuators.

According to the aforementioned aspects, an effect that a workpiece may be reliably gripped by pushing intersecting surfaces of the workpiece may be achieved while reducing the cost.

REFERENCE SIGNS LIST 1 robot hand
3 first movable member
4 second movable member
5 actuator
7a first pushing surface
7b second pushing surface
8 linear guide (guide mechanism, pressing force conversion mechanism)
9a third pushing surface
15 roller
16 tilted surface (pressing force conversion mechanism)
W workpiece

The invention claimed is:

1. A robot hand comprising:
  a first movable member that includes a first pushing surface to be pushed against a first surface of a workpiece and a second pushing surface to be pushed against a second surface of the workpiece, intersecting the first surface, and that is supported in a manner capable of moving in a first direction perpendicular to the first pushing surface;
  a second movable member that is supported by the first movable member in a manner capable of relatively moving in a second direction intersecting a movement direction of the first movable member, and that includes a third pushing surface to be pushed against a third surface facing the second surface;
  an actuator that generates a pressing force for pressing the first movable member and the second movable member in the first direction; and
  a pressing force conversion mechanism that converts a part of the pressing force generated by the actuator into a pressing force in a direction of moving the second movable member relative to the first movable member.

2. The robot hand according to claim 1,
  wherein the first movable member, the second movable member, and the pressing force conversion mechanism are each provided in pair,
  wherein the pair of first movable members are arranged with first pushing surfaces facing each other so that the first pushing surfaces are pushed against the first surfaces of the workpiece that face each other, and
  wherein the actuator generates the pressing force in such a way that one of the first movable members and one of the second movable members come close to the other of the first movable members and the other of the second movable members.

3. The robot hand according to claim 1, wherein the pressing force conversion mechanism is a guide mechanism that guides the second movable member in the second direction that is inclined relative to the first direction at an angle smaller than 90 degrees.

4. The robot hand according to claim 1,
  wherein the second movable member is supported in a manner capable of moving in the second direction that is perpendicular to the movement direction of the first movable member, and
  wherein the pressing force conversion mechanism includes a tilted surface that is fixed to one of the actuator and the second movable member and that is inclined at angles smaller than 90 degrees with respect to the first direction and the second direction, and a roller that is attached to the other of the actuator and the second movable member and that is caused to roll on the tilted surface.

5. The robot hand according to claim 1,
wherein the actuator is configured to press the second movable member in the first direction, and
wherein the robot hand further comprises a retaining mechanism, the retaining mechanism retains the second movable member such that the second movable member does not move relative to the first movable member until a pressing force that is transmitted from the second movable member to the first movable member exceeds a predetermined threshold.

* * * * *